Sept. 29, 1970  J. P. SHANNON  3,531,086
NEEDLE VALVE WITH RESILIENT TIP
Filed Sept. 17, 1968
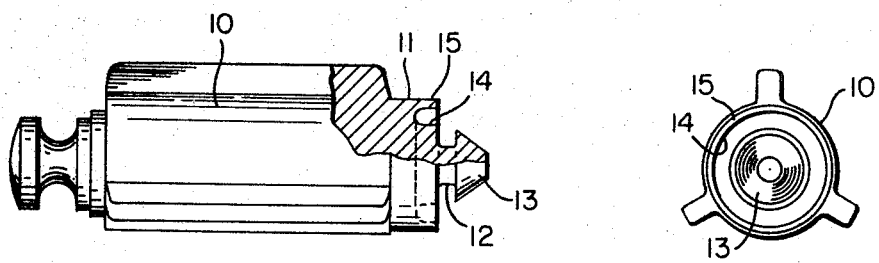
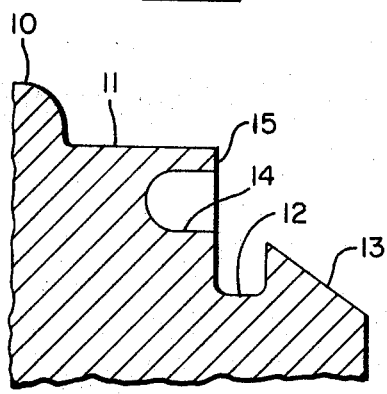
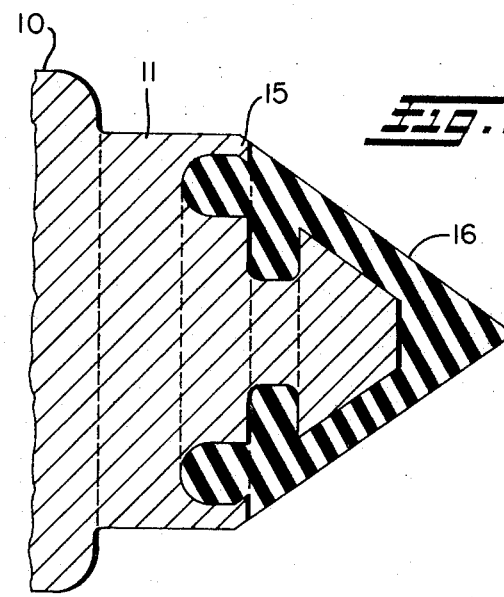
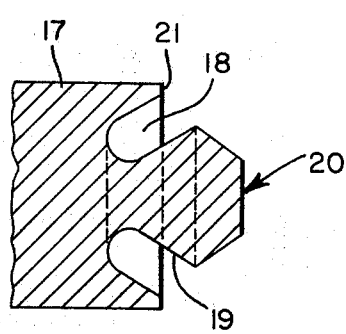
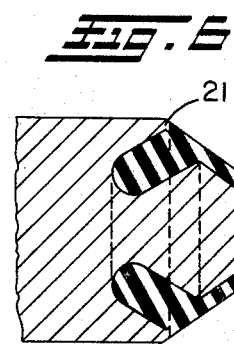
INVENTOR
JAMES P. SHANNON
BY
*Oberlin, Maky, Donnelly & Renner*
ATTORNEYS United States Patent Office 3,531,086
Patented Sept. 29, 1970

3,531,086
NEEDLE VALVE WITH RESILIENT TIP
James P. Shannon, Painesville, Ohio, assignor to Industrial Electronic Rubber Company, Twinsburg, Ohio, a corporation of Ohio
Filed Sept. 17, 1968, Ser. No. 760,287
Int. Cl. F16k 21/00
U.S. Cl. 251—356                                                5 Claims

ABSTRACT OF THE DISCLOSURE

A metal valve body has an integral preform of general spear shape at an end and a groove in the end face forming a ring which is crimped inwardly over the groove, an elastomeric tip being molded on the end about the preform and filling such groove.

---

This invention relates to an improved needle valve of the type in which a resilient tip is molded on the end of a metal body about an integral preform as shown in Guenther U.S. Pat. No. 3,326,520.

According to such patent, the body is an insert in the molding apparatus and method, with the tip directly applied thereto in the molding operation, and the insert end swaged in the closing of the apparatus to seal the cavity against the formation of flash of the molding compound. The Guenther insert end which is thus swaged is cylindrical and the preform projects axially therefrom, the latter comprising a reduced neck and a frustoconical head the included angle of which is the same as that of the finished molded resilient tip. The spear shape of the preform provides mechanical locking of the tip against being pulled from the insert by virtue of a portion of the material being formed about the relatively reduced neck and behind the base of the head.

It is a principal object of the present invention to provide such a valve element in which the end of the metal insert which receives the tip has a novel configuration for more controlled and uniform swaging or crimping of the same and the resulting demarcation between the valve body and the resilient tip.

The new end configuration further provides better sealing of the mold cavity, reduces the need for holding a close tolerance on the insert diameter which is swaged, and assures that the swaging will not result in an increase in this diameter, a circumstance which has occurred in some instances in the production of the Guenther patent element.

It is also a primary object of the invention to provide an improved mechanical anchoring of the resilient tip on the end of the body.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is an elevation of a valve element body or insert in accordance with the present invention, with a portion broken away to enhance the illustration;

FIG. 2 is an end view, from the right in FIG. 1, of such body;

FIG. 3 is a fragmented longitudinal section of the preform end of the body on an enlarged scale;

FIG. 4 is a longitudinal section of such end after application of the resilient tip to the same;

FIG. 5 is a similar section of the body or insert end having a somewhat modified form; and FIG. 6 shows in like section the insert end of FIG. 5 after molding of the tip on the same.

Referring now to the drawing in detail, the body shape of the insert 10 is, apart from the tip end, that of a conventional carburetor needle valve, and it will become clear that both the shape of the body proper and the intended utility of the valve element are not critical factors in the present improvements. The latter are concerned instead with a valve body broadly in the form of a metal insert having a headed end on which there is a resilient sealing body formed directly by molding.

As in the aforesaid Guenther patent, the insert end configuration in the preferred embodiment of FIG. 1 includes a cylindrical section 11 and an axial preform of spear shape, with a reduced cylindrical neck 12 and a frustoconical head 13. However, the end face of the section 11 about the neck is here provided with a continuous annular groove 14, which in the illustrated version has an inside diameter which is slightly larger than the diameter of the base of the preform. The groove in this case will also be seen to be somewhat wider and deeper than the relief about the neck 12.

The groove 14 forms a ring 15 at the outer periphery of the end section 11 which serves as a crimp ring in the forming of the resilient tip. Such operation, as more fully described in the Guenther patent to which reference may be had, entails relatively forcing the end of the insert while properly supported and centered in a tip mold cavity with sufficient pressure to crimp or deform inwardly the corner of the section or, in the case of the new insert, the ring 15, against the wall thereby sealing the cavity. The cavity used with the new element is conical, at the same included angle as the preform, and the molding compound, usually an elastomer, is injected and cured to form the resilient tip body 16 shown in FIG. 4.

It will be evident that the thus formed resilient tip 16 is mechanically locked not only by engaging behind the head 13, but also by filling the groove 14 and behind the inturned or crimped ring 15. As compared to the corner crimping of the Guenther patent, it will also be appreciated that the crimping in the new insert is always inward, so that the outside diameter of the section 11 is a less critical dimension and there is positive protection against any outward deformation of the corner which would tend to make this section oversized. The improved sealing of the mold cavity is another readily apparent benefit, with a cleaner line between the resilient material and the metal, which is particularly desirable in the case of a valve plunger for a solenoid and the like where uniform metal exposure is significant in the electrical activation of the device.

The thickness of the crimp ring 15 can be varied best to suit the particular metal of which the body is formed. For example, with a relatively soft metal, such as aluminum, it is desirable to provide a thicker crimp ring than with harder metals, such as brass and stainless steel, with this of course relating to the ease of deformation consistent with the desire to efficiently seal the mold cavity.

The alternative embodiment shown in FIGS. 5 and 6 involves a modification of the more or less standard spear type of preform. The insert end 17 here is provided with an annular groove 18 which is inclined inwardly to define as well at its inside diameter an outwardly flaring neck 19 for the preform 20. The groove is still spaced inwardly from the outer surface of the cylindrical end section 17 to leave a lip or ring 21 for crimping in the manner previously described and as evident in the finished element of FIG. 6, with applied tip 16'. The angle and depth of this groove can be varied, and also the resulting thickness of the crimp ring 21, for example, in reference to the metal selection discussed in the foregoing.

The metal valve body, as is conventional, can be made by turning cut extruded stock to form the ends, the tip end groove is cut, and the body is then ready for the tip molding operation described in the foregoing, so that production of the new element poses no added problem and can be accomplished as readily as the known elements on the same order.

Other modes of applying the principle of the invention may be employed, change being made as regards the details described, provided the features stated in any of the following claims or the equivalent of such be employed.

I, therefore, particularly point out and distinctly claim as my invention:

1. A valve element comprising a metal body having at one end a cylindrical part with an end face and an axial extension which projects outwardly of said end face, said extension having a neck-defining peripheral relief about the same adjacent said end face, a groove in said end face forming an outer lip the extreme end of which is deformed inwardly to conical form and partially overlies the groove, and a body of resilient sealing material molded about said extension and filling said relief and said groove behind the lip, the outer surface of said body adjacent the lip being conical and the lip outer surface a continuation of the shape thereof, with the body thereby forming a resilient tip anchored on the end of the body.

2. A valve element as set forth in claim 1, wherein the groove in the body end is concentric therewith.

3. A valve element as set forth in claim 1, wherein the groove in the body end is inclined inwardly.

4. A valve element as set forth in claim 1, wherein the relief in said extension forms a cylindrical neck, and the outer part is generally conical.

5. A valve element as set forth in claim 1, wherein the relief in the extension forms an outwardly flaring neck, and the outer part is oppositely conically tapered.

References Cited

UNITED STATES PATENTS

| | | | |
|---|---|---|---|
| 2,414,577 | 1/1947 | Adair et al. | 137—434 |
| 2,516,947 | 8/1950 | Blevans | 251—315 |
| 2,782,801 | 2/1957 | Ludwig | 251—356 XR |
| 2,925,994 | 2/1960 | Downs et al. | 251—360 |
| 3,131,906 | 5/1964 | King | 251—360 |
| 3,236,496 | 2/1966 | Rosenstem et al. | 251—357 |
| 3,381,351 | 5/1968 | Szwargulski | 137—434 XR |

SAMUEL SCOTT, Primary Examiner

U.S. Cl. X.R.

137—434